Relation between the concentration of magnesium chloride and the purity of magnesium hydroxide obtained Mixing ration ............... CaO:MgO = 1:0.95
Effective lime ............... 95%
Reaction temperature ....... 60°C
Reaction time ............... 3 hrs.

FIG. 6

Relation between the reaction time and the purity of magnesium hydroxide obtained Mixing ratio .................. CaO:MgO=1:0.95
Effective lime ............... 95%
Reaction temperatu ....... 57°C

3,676,067
PRODUCTION OF FRESH WATER, BRINE AND MAGNESIUM HYDROXIDE
Hisanobu Tabata and Norimasa Tabata, both of 968 Kou, Ohgoshi-machi, Sakaide-shi, and Rokuro Nakajima, 1831 Ohyabu-cho, Sakaide-shi, all of Kanagawa-ken, Japan
Filed June 15, 1970, Ser. No. 46,286
Claims priority, application Japan, June 19, 1969, 44/48,416, 44/48,417
Int. Cl. C01b *5/00;* C01d *3/00;* C01f *5/14*
U.S. Cl. 23—204 R    10 Claims

ABSTRACT OF THE DISCLOSURE

Disclosed is a method for making fresh water and brine from sea water by reacting bittern, obtained, for example, from the extraction of common salt, with calcium oxide to form an aqueous suspension of magnesium hydroxide which is treated with carbon dioxide to form magnesium carbonate. The magnesium carbonate is added to the sea water to precipitate calcium out of the water as calcium carbonate which is filtered off and the remaining solution is concentrated to produce fresh water and brine. Also disclosed is a method for preparing magnesium hydroxide wherein an aqueous magnesium chloride solution is mixed with quicklime in a closed, rotary reaction zone at a temperature of about 50° to 70° C. at a pH of about 8.0 to 8.5.

---

This invention relates to a method of manufacturing fresh water and concentrated brine or salt water from sea water by evaporating therefrom the scale forming component, calcium sulphate. To remove calcium sulphate, magnesium hydroxide is precipitated from the bittern obtained as a by-product in the manufacture of common salt, and is converted to magnesium carbonate which is added to the sea water to precipitate calcium sulphate contained therein as calcium carbonate, and filtered off.

This invention also relates to a method of manufacturing magnesium hydroxide usable in making fresh water and concentrated brine.

The conventional method of making fresh water and brine from sea water is to evaporate sea water either after acidifying it with acid and adding a reagent to prevent the precipitation of calcium sulphate, or after precipitating calcium sulphate directly therefrom by the addition of a seed to accelerate its precipitation.

Undesirably, these methods have serious drawbacks.

In the former method, in order to prevent the precipitation of calcium carbonate and calcium hydroxide in the early stage of concentration, sea water is acidified until its pH becomes about 4, and a reagent, chiefly consisting of phosphate, is added to prevent the precipitation of calcium sulphate. Because the solution has a pH of about 4, the equipment used must be acid resistant. Moreover, as the reagent which prevents the precipitation of calcium sulphate decomposes at higher temperatures, high temperature treatment is impossible. As the efficiency of this reagent decreases with the increase of the concentration of sea water during operation, the upper limit of possible concentration is about 6° Bé, and further concentration is almost impossible by this method.

The latter method is to add calcium sulphate as a seed for its precipitation, and to prevent the formation of scale on the heat conducting surface by growing calcium sulphate on the surface of its seed. However, calcium sulphate has several forms and is very sensitive to temperature and to the concentration of the sea water. To use seed, it is necessary to select calcium sulphate of the same form as is deposited in the course of concentration which varies according to the conditions, and the seed must be very fine and ungrown. Moreover, to be effective, the amount of seed must be as much as 5–10% of the calcium sulphate contained in the sea water. As a result, the process is very difficult to control and as the amount of seed is considerable, the flow velocity required to evaporate the sea water in the heat conducting tube must be high. Accordingly, the evaporation of efficiency becomes very low. The method can hardly be adopted with multi-stage evaporator with varying temperatures such as flash evaporator.

While the concentrated brine obtained by these methods must further be evaporated in order to obtain common salt, the evaporation must be carried out with the addition of bittern to prevent the formation of scale. However, the addition of bittern raises the boiling point of the brine, and as the heat efficiency in the evaporation is decreased, the equipment used must be large.

This invention provides a very advantageous method of treating a water having no theoretical limit as regards temperature and concentration in evaporation. There is no need of adding bittern in the further evaporation of the brine to obtain common salt. The increase in the solution boiling point is small and the heat efficiency is high. The method can be carried out in small scale equipment.

This invention is a method of manufacturing fresh water and brine from sea water wherein a 2–3% aqueous suspension of magnesium hydroxide obtained by the reaction between the bittern obtained as a by-product in the manufacture of common salt and quicklime, contacted with carbon dioxide previously purified by washing with a portion of said magnesium hydroxide liquor to form magnesium carbonate with a composition of $CO_2:MgO=1:1.20-0.95$ n mol; the magnesium carbonate being added, as an aqueous suspension, as its stands or after separation, to sea water in the rates of $Ca^{++}:CO_3^{--}=1:1.2$ to the $Ca^{++}$ contained in sea water to precipitate calcium sulphate as calcium carbonate; and the sea water purified in this way is concentrated, after filtration, by evaporation to obtain fresh water and brine.

The present invention further relates to a process for producing magnesium hydroxide usable in the production of fresh water and concentrated brine from sea water, which comprises reacting a solution of magnesium chloride directly with quicklime. More practically, the present invention is a method of manufacturing magnesium hydroxide with high purity in which a concentrated solution of magnesium chloride, by-produced during the treatment of the sea water for example, is charged together with quicklime in lump (or pellet) form, in a closed vessel containing steel balls, the quicklime is ground by rotating said vessel, and the ground quicklime is reacted step by step with magnesium chloride to obtain magnesium hydroxide.

The present invention now will be described in detail reference being made to the accompanying drawings in which.

Figure 1:
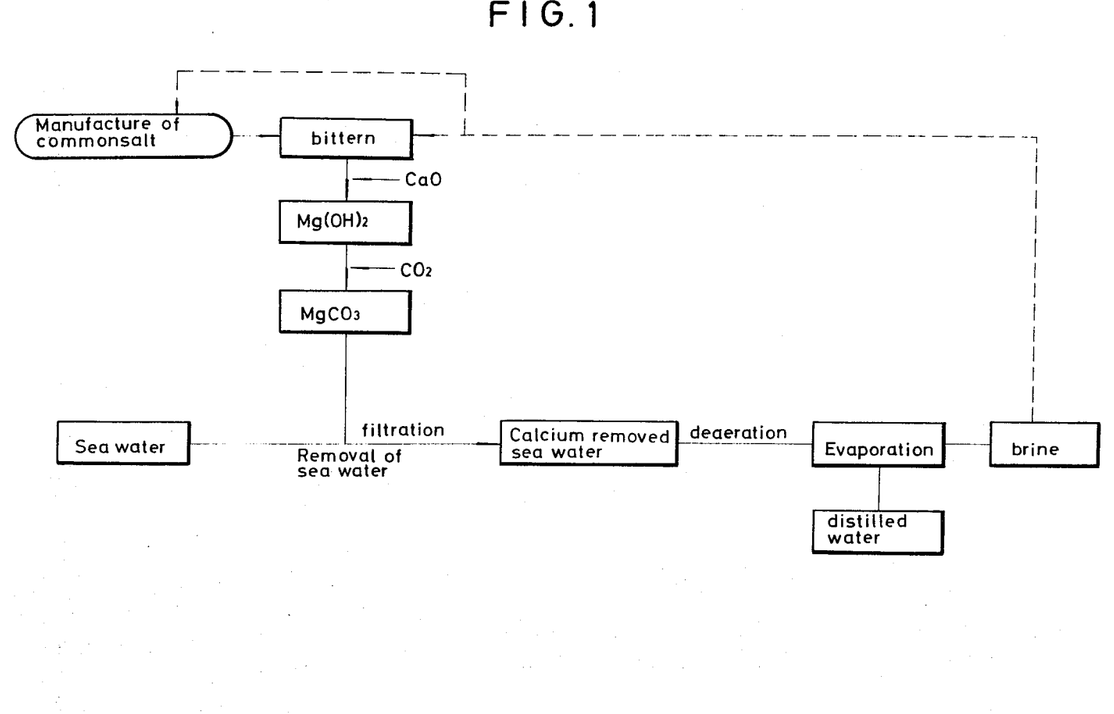
FIG. 1 is a schematic diagram showing the process of producing fresh water and brine according to the present invention.

The process of treating sea water in this invention will be explained by referring to FIG. 1. The bittern obtained as a by-product in the manufacture of common salt and the like is reacted with quicklime to obtain magnesium hydroxide; carbon dioxide is absorbed in an aqueous suspension of said magnesium hydroxide to form magnesium carbonate, the magnesium carbonate is added to sea water to precipitate calcium sulphate dissolved in sea water as calcium carbonate, and the precipitate is filtered off. The purified sea water is concentrated in a flash evaporator or other evaporator, or by ion exchange to obtain fresh water and brine. The bittern obtained as a by-product in the further treatment of this brine may be recycled to the first stage of this invention to improve the economics of the process.

The prior art method of manufacturing magnesium hydroxide by reacting calcium hydroxide obtained by slaking quicklime with a solution of magnesium chloride, has several disadvantages:

(1) To obtain calcium hydroxide, it is necessary to slake quicklime with water, and calcium hydroxide so obtained must be separated from coarse impurities, for instance, by passing through a sieve. As a result, the yield of calcium hydroxide is low.

Additionally calcium carbonate is formed by the reaction of lime with carbon dioxide dissolved in water thereby decreasing the purity of the product. To manufacture magnesium hydroxide with high purity, it is necessary to first remove carbon dioxide from the water used for slaking, and to carry out the process of slaking in a closed vessel to prevent contamination by carbon dioxide. As a practical matter since the process of purifying the slaked lime is carried out in open air, the formation of calcium carbonate cannot be avoided. Depending on the purity of the raw material, the loss of calcium oxide reaches, as high as 15%.

(2) It is necessary to heat the charge when reacting the slaked lime with a solution of magnesium chloride. Moreover, as the reaction does not go to completion, leaving unreacted calcium hydroxide in the product, the purity and the yield of the product are decreased.

(3) Similarly with the prior art method, it is important to control the pH during the reaction. If the amount of calcium exceeds the amount of magnesium even for a short time, the precipitated magnesium hydroxide becomes colloidal, these colloidal particles absorb $Ca^{++}$, and the magnesium hydroxide becomes impure. At the same time, the filtration and the washing of the magnesium hydroxide in the following stage becomes difficult. Therefore, it is necessary to charge magnesium chloride solution and milk of lime simultaneously, and to carefully control the pH in order to prevent even a momentary excess of calcium hydroxide. Practically, for instance, a 10% solution of magnesium chloride and a 17% milk of lime solution are charged simultaneously at 70° C. for 6 hrs., and after agitating further for 2 hrs. the mixture is filtered to obtain magnesium hydroxide.

However, as the particles of magnesium hydroxide obtained in this method are very fine, filtration and washing are difficult. As the calcium chloride solution obtained as a mother liquor of the reaction is dilute, the solution must be concentrated by heating in order to recover and to utilize calcium chloride.

For these reasons, it is necessary in this prior method to use large scale equipment such as slaking, refining and heating devices. The purity of the product is not satisfactory and the method is costly.

Another object of this invention is to provide an advantageous method of manufacturing high purity magnesium hydroxide. In accordance with this object an aqueous solution of magnesium chloride and quicklime in lump form are charged in a ratio of 1:0.9–0.95 calculated as in mol, in a closed vessel containing steel balls, the closed vessel is rotated, and the reaction is completed by maintaining the pH of the charge at 8.0–8.5.

Figure 3:
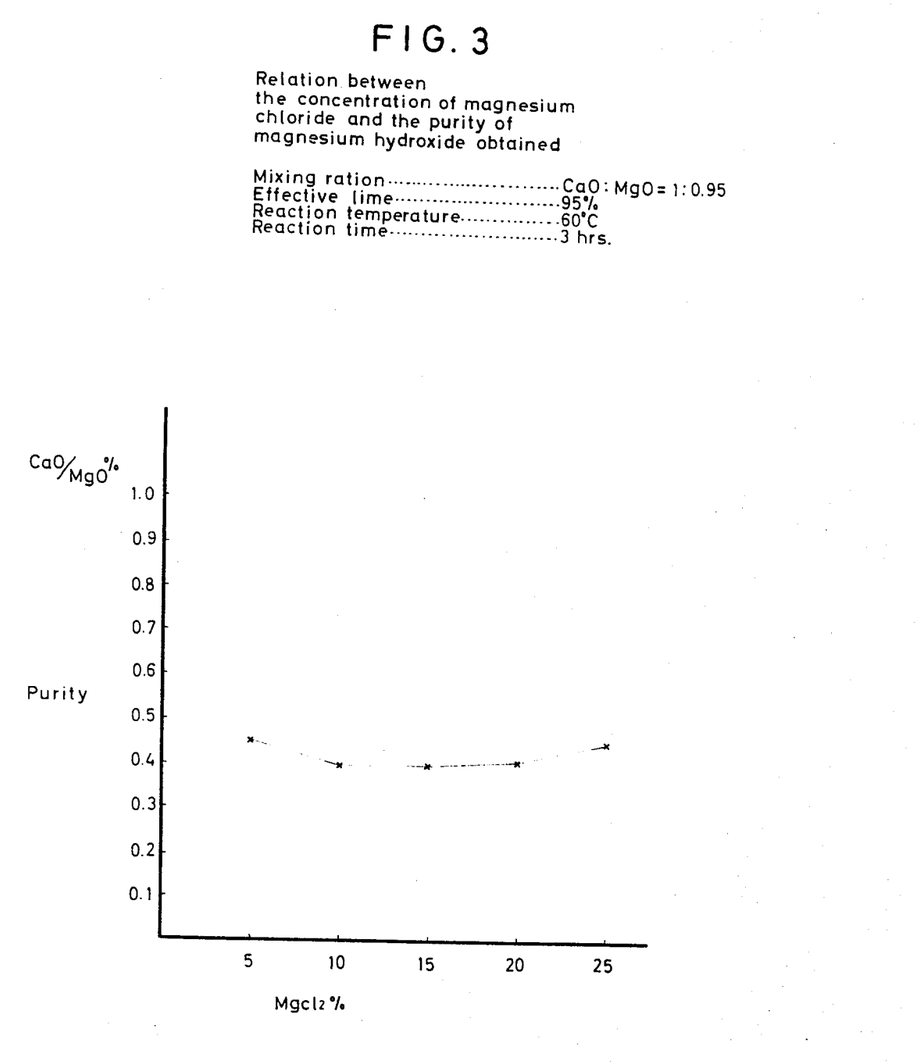
FIG. 3 is a graph showing the relationship between the concentration of magnesium chloride and the purity of magnesium hydroxide obtained.

As seen from FIG. 3 which shows the relation between the purity of magnesium hydroxide and the concentration of magnesium chloride at 60° C. it is desirable to use a 7–23% aqueous magnesium chloride solution for the reaction. Moreover, when the magnesium chloride concentration is under 7%, it is difficult to raise the reaction temperature sufficiently high in practical operation; the reaction is incomplete and the purity of the product becomes unsatisfactory, containing unreacted raw materials. The reaction proceeds also slowly when the concentration is over 25%.

Raw bittern, obtained as a mother liquor in the manufacture of common salt from sea water, contains about 20–26% of magnesium chloride together with about 10% of magnesium sulfate. When this raw bittern is treated with calcium chloride to remove the sulfate as calcium sulfate, it becomes a convenient source of magnesium chloride for this invention, directly or diluted to some extent.

Figure 4:
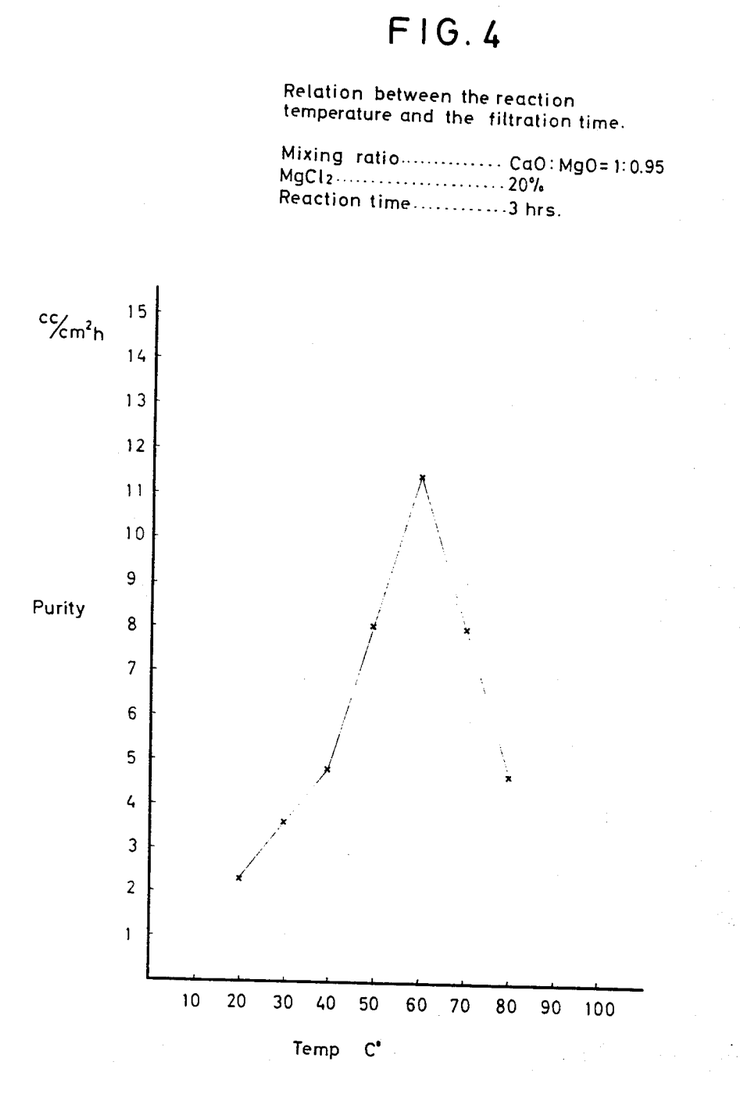
FIG. 4 is a curve which shows the relationship between the reaction temperature and the filtration time.

As shown in FIG. 4, the filtration of the product can most readily be effected when the reaction temperature is about 50–70° C. This fact indicates that the particles formed are well crystallized, having a relatively large diameter of about $50\mu$. The optimum reaction temperature lies in this range. When the magnesium chloride concentration is about 7–23%, the reaction temperature can be maintained at about 50–70° C., although differing somewhat from the reaction conditions mentioned below.

It is desirable that the lump size of the quicklime used in this invention be mainly of a diameter of about 5–20 cm., with less than 50% powder. When the quicklime contains more than 50% powder, the reaction proceeds rapidly and the pH increases. When the pH exceeds 10.5 even for a moment, the precipitated magnesium hydroxide becomes colloidal, absorbs $Ca^{++}$ and becomes impure. The formation of colloidal magnesium hydroxide should carefully be prevented.

Figure 5:
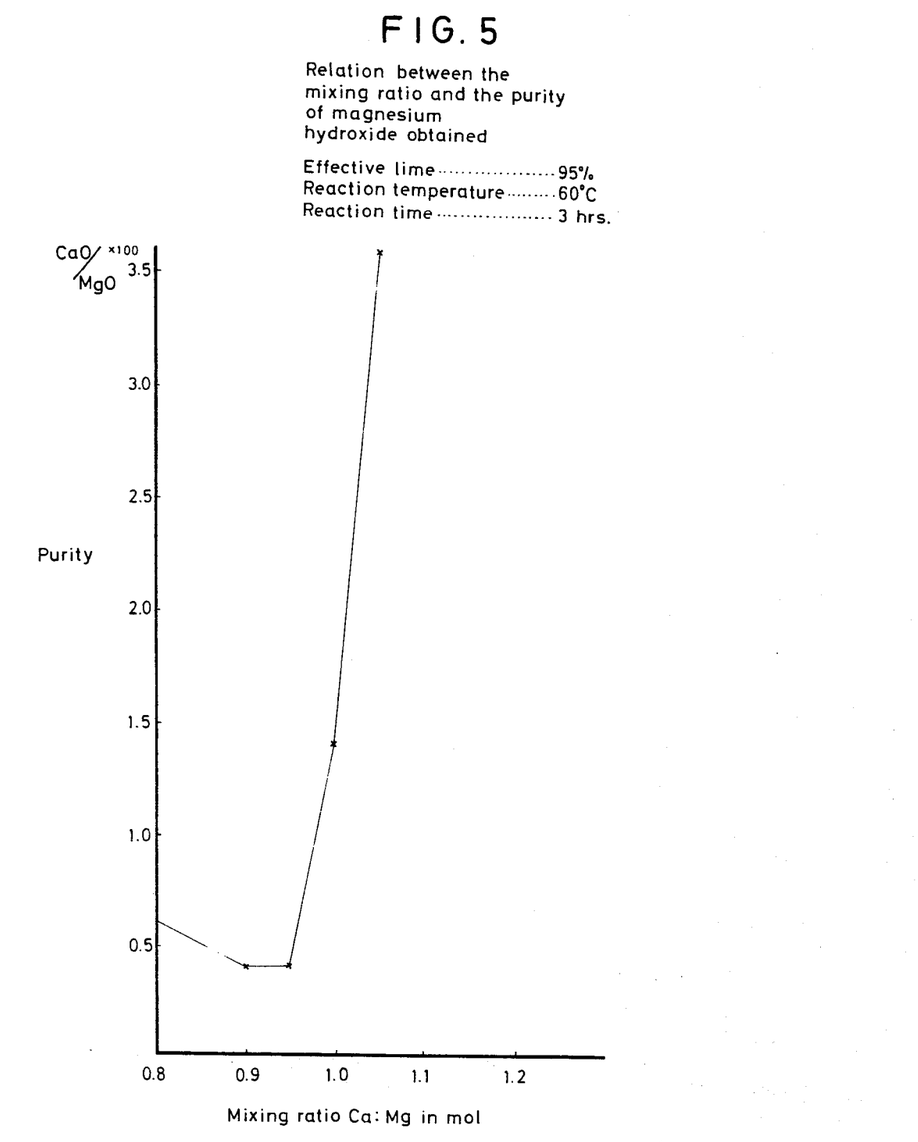
FIG. 5 is a curve which shows the relation between the mixing ratio and the purity of magnesium hydroxide obtained.

It is desirable to select the mixing ratio of magnesium chloride solution and quicklime to be 1:0.9–0.95 calculated as MgO:CaO in mol. As seen from FIG. 5, magnesium hydroxide becomes impure outside this range, chiefly owing to the contamination by unreacted lime. From the standpoint of process control and operation cost etc., it is desirable that the mixing ratio be as close to 5 0.95 as possible.

The reaction is carried out in a closed vessel. It is desirable that the free space in the vessel is as small as possible in charging the reaction mixture in order to prevent the formation of calcium carbonate due to the carbon dioxide in air.

The reaction vessel is rotated to grind quicklime in lump form gradually and to react the pulverized quicklime slowly with magnesium chloride, maintaining the pH of the charge within the range of 8.0–8.5. The rotation speed of the reaction vessel is controlled in accordance with conditions, such as the number and size of the steel balls, to maintain the pH in the desired range of 8.0–8.5 and to finish the reaction in about 3 hrs. Under these conditions, the reaction temperature can be maintained at the optimum of about 50–70° C. as previously stated.

The closed reaction vessel consists of a steel rotary vessel which contains steel balls having a diameter of about 10 cm. The number of steel balls as well as the rotation of the vessel are selected so as to satisfy the reaction conditions above-mentioned.

Quicklime in lump form can be used for the reaction. As the quicklime in lump form is ground gradually by the steel balls in the closed reaction vessel and is reacted slowly with magnesium chloride, there is no danger of sudden temperature rise or of rapid pH increase. Therefore, the precipitated magnesium hydroxide crystallizes well in relatively large particles of high purity, without forming colloidal particles, and accordingly the finishing of the product, filtration and washing, can be effected quite readily. Further, as concentrated calcium chloride is obtained as a mother liquor in the reaction between quicklime and magnesium chloride, its recovery is also quite economical, consuming only a small amount of heat for its further concentration.

The details of this invention will be illustrated by the following examples.

The bittern obtained in manufacturing common salt from the brine of this invention or the bittern obtained by the common process is first treated with quicklime to obtain magnesium hydroxide. It is desirable that magnesium hydroxide be very pure and have a relatively coarse particle size of about $50\mu$. The $Mg(OH)_2$ is prepared as follows:

An aqueous 7–23% magnesium chloride solution (bittern) and quicklime in lump form mainly of a particle size of 5–20 cm. in diameter are charged, in a ratio of 1:09–0.95 calculated as MgO:CaO, in a closed vessel containing steel balls, the closed vessel is rotated, and the reaction is effected by maintaining the pH of the charge at 8.0–8.5. The magnesium hydroxide obtained is very pure, and its washing and filtration in the following stage are very easy.

Then magnesium carbonate is manufactured by absorbing carbon dioxide in said magnesium hydroxide. In the prior art, the carbon dioxide from the calcination of magnesite, limestone or dolomite (18–25%) was used. The gas was freed from dust, washed with water and absorbed in an absorption tower under a pressure of 2–3 kg./cm.$^2$g. to manufacture magnesium carbonate. However, in this invention, waste combustion gas such as boiler gas is used as the source of carbon dioxide. In a 2–3% aqueous liquor of magnesium hydroxide obtained in the previous stage, the gas is absorbed after washing with a portion of said aqueous magnesium hydroxide liquor. Not only the cost of the carbon dioxide material is almost zero, but also the process is air pollution-free.

EXAMPLE 1

Manufacturing fresh water and brine

Figure 2:
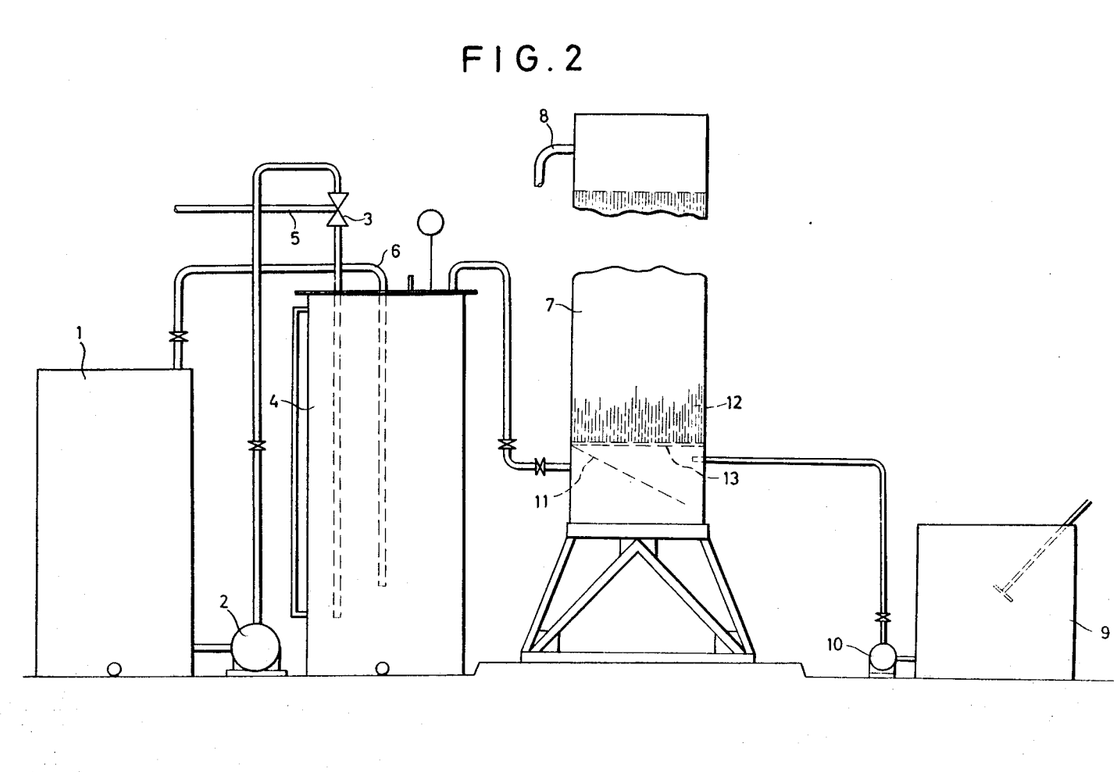
FIG. 2 is a schematic view of apparatus suitable for use in the method of the invention.

As shown in FIG. 2, 1 is a storage tank containing about one half (volume) of the aqueous 2–3% magnesium hydroxide suspension and the suspension is pumped from the bottom of this tank to a pressure washing tank 4 through an ejector with the aid of a pump 2. An ejector 3 sucks combustion gas at the same time, and the gas is washed with the suspension. This gas liquid ejector 3 is fitted at the top of the pressure washing tank, and the tank 4 consists of a closed vessel with, for example, a diameter of 800 mm. and a height of 2000 mm. A crude combustion gas or boiler gas is sucked through a pipe 5 by the ejector 3, washed sufficiently with the liquor and enters in the tank 4. As the tank 4 is closed, its inner pressure becomes about 0.4 kg./cm.$^2$g., and the gas is separated from the liquor in this tank. The gas purified by washing is blown, as shown in the figure, through a pipe into an absorption tower 7 from its bottom in the form of bubbles.

The magnesium hydroxide liquor in the tank 4 used for the washing of the gas is circulated through a pipe 6 to the tank 1, and is renewed occasionally when the liquor becomes contaminated.

The absorption tower 7 contains an aqueous 2–3% magnesium hydroxide suspension to a height of 4 m., and this magnesium hydroxide is carbonated with the carbon dioxide gas coming from 4 to give magnesium carbonate. Magnesium carbonate so obtained flows out together with the mother liquor from pipe 8 at the top of the tower. In the figure, 9 is a tank containing a 2–3% aqueous magnesium hydroxide suspension which is pumped to the tower 7 through a pressure pump 10. In the absorption tower 7, a gas distribution plate 11 and pipes are provided to accelerate the reaction while 13 is a wire netting to support the pipes 12. The result of a run using this equipment is as follows: a 1.5 kw. circulation pump with a working capacity of 15 t./hr., an ejector with a nozzle diameter of 14 mm. were used, and a boiler waste gas with a carbon dioxide concentration of 13.5% was sucked. A 2% aqueous magnesium hydroxide suspension was used as an absorption liquor with a flow rate of 400 l./hr., and 12 kg. of pure basic magnesium carbonate was obtained per hour. The reason why a 2–3% aqueous magnesium hydroxide suspension is preferred is, as shown from the following table, the composition of magnesium carbonate obtained lies in the range most suitable for the removal of calcium from sea water in the following stage. Indeed, when the reaction is carried out by using magnesium carbonate having a composition in this range, calcium is removed most effectively, and moreover, the amount of sulphuric acid required for the pH control of the treated sea water is reduced to a minimum amount.

| $Mg(OH)_2$ concentr. (percent) | $CO_2/MgO$ | Ca removal (percent) | $MgCO_3$ concentr. (percent) | $H_2SO_4$ for pH control (cc./kl. sea water) |
|---|---|---|---|---|
| 1* | 2.00 | 90 | 1.5 | 150 |
| 2 | 1.20 | 98 | 3.0 | 100 |
| 3 | 0.95 | 85 | 4.5 | 120 |
| 4 | 0.80 | 75 | 6.0 | 150 |

*As the concentration of magnesium carbonate is dilute, the amount of water to be evaporated becomes large.

The conventional method of purifying combustion gas such as waste boiler gas by washing and the method of manufacturing magnesium carbonate by using the purified gas is as follows: ash and dust of the gas are removed first through a dust collector, then the gas is washed through a washing tower, and is absorbed in an aqueous magnesium hydroxide suspension in an absorption tower to obtain magnesium carbonate. In that method, a costly high power compressor is needed to operate a dust collector and a washing tower. Moreover, as a continuous operation for a long time is almost impossible due to the adhesion of scale contained in the carbon dioxide on the surface of the valve of compressor and the like, it is usual to provide a spare compressor and to use them alternately. Therefore, in that method, the electric power consumption is large, considerable man power is needed, and careful process control is required. Moreover, as carbon dioxide is diluted due to the dissolution in the large amount of water necessary for the washing, it is necessary to increase the pressure of the gas to compensate for its dilution.

This invention eliminates these drawbacks. By using an ejector, the three operations of suction, washing and compression of carbon dioxide can be carried out in one step. Therefore, the compression pressure is low enough, and only one pump is needed for the circulation of the driving liquor of the ejector. As the wash liquor of the gas is circulated as the driving liquor of the ejector, only a small amount of wash liquor is necessary. Moreover, as the concentration of carbon dioxide is always almost constant, process control is quite simple, and it is possible to manufacture high purity magnesium carbonate.

The material balance for the present method is compared below with that of the conventional method. To obtain 100 kg. magnesium the comparison is:

|  | $Mg(OH)_2$ (kg.) | $CO_2$ (kg.) | Electric power (kw.h.) | Wash water (t) |
|---|---|---|---|---|
| Method of this invention | 70 | 170 | 43 | 0.6 |
| Conventional method | 70 | 200 | 90 | 100 |

An aqueous magnesium carbonate suspension with the composition of $CO_2:MgO=1.20-0.95$ obtained in the above process was added without filtration, to sea water to react with $Ca^{++}$ dissolved in sea water in an amount of $Ca^{++}/CO_2=1.2$. When the reaction was carried out at 40° C. for 3 hrs. under stirring, the removal of calcium after filtration was 98%. The purified sea water was neutralized to pH 7 with sulphuric acid, deaerated, and lead to a flash evaporator. When 20.6 kl. of the purified sea water was evaporated in a flash evaporator, 4.3 kl. of the brine with a concentration of 15° Bé was obtained together with 16.34 kl. of fresh water. Similar results were obtained by using magnesium carbonate after separation, or by using a common evaporator or by ion exchange.

The fresh water obtained was very pure, containing only less then 20 p.p.m. of chlorine, and was suitable as drinking water or for use in boilers. Heavy water was concentrated in this brine, and on further concentration the content of heavy water in 34° Bé bittern was 0.28%, and in more concentrated bittern, 0.34%.

EXAMPLE 2

Production of magnesium hydroxide

To a closed vessel of a cylindrical rotary drum with a diameter of 750 mm., a length of 750 mm. and a capacity of 400 l. containing 20 steel balls with a diameter of 10 cm., 35 kg. of quicklime in lump form with a diameter of 10–20 cm. and 300 l. of a 20% aqueous magnesium chloride solution were charged. There was almost no free space in the vessel.

The closed vessel was rotated 30 times per minute. Quicklime in lump form was ground gradually by the steel balls and reacted slowly with magnesium chloride. No sudden increase of the pH was observed, maintaining the pH at 8.0–8.5. The reaction-temperature was almost constant at about 60° C. After reacting for 3 hrs., the product was filtered through a belt filter. After washing, the magnesium hydroxide product had a particle size of about 50μ and was very pure.

Figure 6:
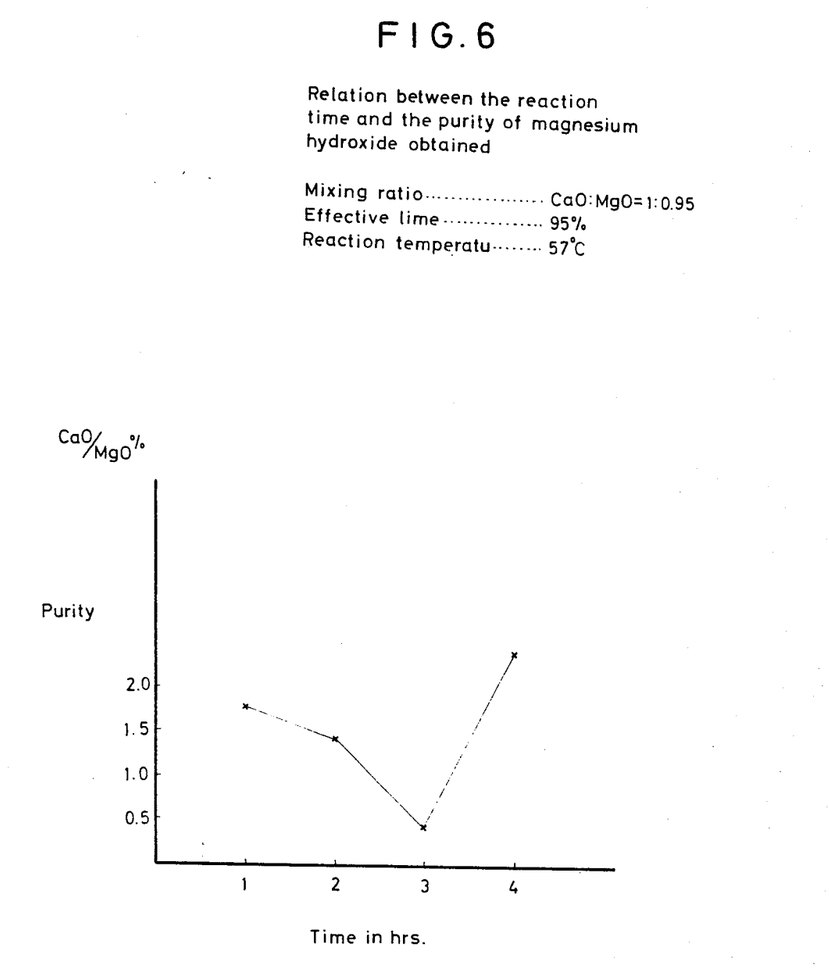
FIG. 6 is a curve which shows the relation between the reaction time and the purity of magnesium hydroxide obtained.

The relation between reaction time and the purity of magnesium hydroxide obtained in the same condition as above-mentioned is shown in FIG. 6. Although the reason is not certain, the product after 3 hrs. was purest.

The results are compared below with those of the conventional method under similar conditions.

For 100 kg. Mg(OH)$_2$ on the dissolved $Ca^{++}$ in sea water, treated at 60° C. for 3 hrs. to precipitate $Ca^{++}$ as calcium carbonate, and filtered. 98% of $Ca^{++}$ in sea water was removed. 20.6 kl. of the mother liquor was deaerated, its pH was brought to 6.5 with sulphuric acid, and was evaporated in a flash evaporator. 3.4 kl. of 15° Bé brine was obtained, and the chlorine content of the fresh water distilled was only 20 p.p.m. Heavy water was concentrated in the brine, and on further concentration the content of heavy water in 34° Bé bittern was 0.28%, and in more concentrated bittern, 0.34%.

After 10 days of continuous operation by the flash evaporator, no scale formation was observed.

As above-mentioned, the present invention offers an economic method of treating sea water, in which magnesium carbonate suitable for the reaction is manufactured advantageously, from magnesium hydroxide, and from the bittern obtained as a by-product in the manufacture of common salt from sea water, the sea water is purified by treatment with magnesium carbonate; and evaporated with a high heat efficiency and without the formation of scale to obtain the brine, which can further be concentrated to manufacture common salt without the addition of bittern, together with very pure fresh water.

What is claimed is:

1. A method of producing fresh water and brine from sea water which comprises: reacting bittern containing magnesium chloride together with magnesium sulfate with calcium oxide to form an aqueous suspension of magnesium hydroxide, reacting said magnesium hydroxide with carbon dioxide to form a magnesium carbonate suspension in which the mole ratio $CO_2:MgO=1:1.20–0.95$ and then mixing said magnesium carbonate with said sea water in a molar ratio of $Ca^{++}:CO_3^{--}=1:1.2$ relative to the $Ca^{++}$ in said sea water to precipitate calcium from said sea water as calcium carbonate, filtering off said calcium carbonate from said sea water to obtain calcium-free sea water and concentrating said calcium-free sea water to obtain fresh water and brine.

|  | Charged | | | | | Consumed | |
| --- | --- | --- | --- | --- | --- | --- | --- |
|  | CaO (kg.) | MgCl$_2$ (kg.) | CaO:MgO | Reaction time (hrs.) | Aq. CaCl$_2$ obtained (l.) | Vapour (kg.) | Electric power (kw.h.) |
| Method of this invention | 100 | 177 | 0.95:1.0 | 3 | 858 (20%) | 0 | 1 |
| Conventional method | 120 | 199 | 0.95:1.0 | 8 | 2,500 (7%) | 1,050 | 8.2 |

EXAMPLE 3

Production of magnesium hydroxide

As in Example 2, an aqueous magnesium chloride solution and quicklime were charged to the closed vessel which contained 40 steel balls, the vessel was rotated with a revolution of 15 times per min. for 3 hrs. Substantially the same result was obtained as in Example 2.

The method of this invention offers excellent results in combination with the process of treating sea water to obtain common salt, for instance, as shown in FIG. 6.

Relatively concentrated bittern, obtained as a by-product in the treatment of sea water to manufacture common salt was used as the source of magnesium chloride in this invention. High purity, magnesium hydroxide, obtained by the reaction between this bittern and quicklime according to this invention, was made to a 2–3% milk of magnesia, and was connected to magnesium carbonate by introducing carbon dioxide previously washed with a portion of the same milk of magnesia. This magnesia carbonate was added to sea water, in amount of $Ca^{++}:CO_2=1:1.2$ based 2. The method according to claim 1, wherein said calcium-free sea water is deaerated prior to said concentrating.

3. The method according to claim 1, wherein said brine is recycled by mixing with said bittern.

4. The method according to claim 1, wherein said carbon dioxide is purified by washing with a portion of said magnesium hydroxide suspension.

5. The method according to claim 1, wherein said calcium-free sea water is concentrated by evaporation to produce said fresh water and said brine.

6. The method according to claim 1, wherein said calcium-free sea water is concentrated by ion exchange.

7. The method according to claim 1, wherein said carbon dioxide is present in a waste gas stream.

8. The method of claim 1, wherein said suspension of magnesium hydroxide contains 1 to 3 percent of magnesium hydroxide.

9. The method according to claim 1, wherein said magnesium carbonate is mixed with said sea water at a temperature of about 40° to about 60° C. over a period of about three hours.

10. The method according to claim 1, wherein said calcium-free sea water has its pH adjusted to about 7 prior to concentrating same.

References Cited
UNITED STATES PATENTS

| | | | |
|---|---|---|---|
| 2,979,442 | 4/1961 | Badger | 203—7 |
| 2,733,196 | 1/1956 | Hillier et al. | 203—7 |
| 3,033,650 | 5/1962 | Sable | 23—186 |
| 3,262,865 | 7/1966 | Waters, Jr. | 203—7 |

OSCAR R. VERTIZ, Primary Examiner

H. S. MILLER, Assistant Examiner

U.S. Cl. X.R.

23—66, 89, 186; 203—7